United States Patent [19]

Küng et al.

[11] 4,392,213
[45] Jul. 5, 1983

[54] CURRENT IMPULSE METHOD AND APPARATUS FOR TESTING GEOPHONE STRINGS

[75] Inventors: Edward J. Küng, Calgary, Canada; Eugene D. Bednard, Houston, Tex.

[73] Assignee: Shell Oil Company, Houston, Tex.

[21] Appl. No.: 168,956

[22] Filed: Jul. 11, 1980

[51] Int. Cl.³ ............................................. G01V 1/16
[52] U.S. Cl. ....................................... 367/13; 73/10 V
[58] Field of Search ................. 367/13, 20, 58, 63, 367/135, 178; 73/1 DV

[56] References Cited

U.S. PATENT DOCUMENTS

| | | | |
|---|---|---|---|
| 3,858,169 | 12/1974 | Bardeen | 2367/13 |
| 4,003,018 | 1/1977 | McCormick | 73/1 DV |
| 4,043,175 | 8/1977 | Fredriksson et al. | 367/13 |
| 4,233,677 | 11/1980 | Brown | 367/13 |

OTHER PUBLICATIONS

"System Aids Field Testing of Geophones", Convert et al, Oil & Gas Journal, Nov. 5, 1978, p. 88.

*Primary Examiner*—Sal Cangialosi

[57] ABSTRACT

A method and apparatus for testing geophones to measure the response of the geophones and associated circuits and obtain a signal that can be used to deconvolve recorded seismic data. The method comprises applying a constant voltage or current to the geophones, removing the voltage or current and measuring the geophone response. The second derivative of the response is the time equivalent of the velocity response of the geophone and can be used in deconvolving recorded seismic data.

6 Claims, 2 Drawing Figures

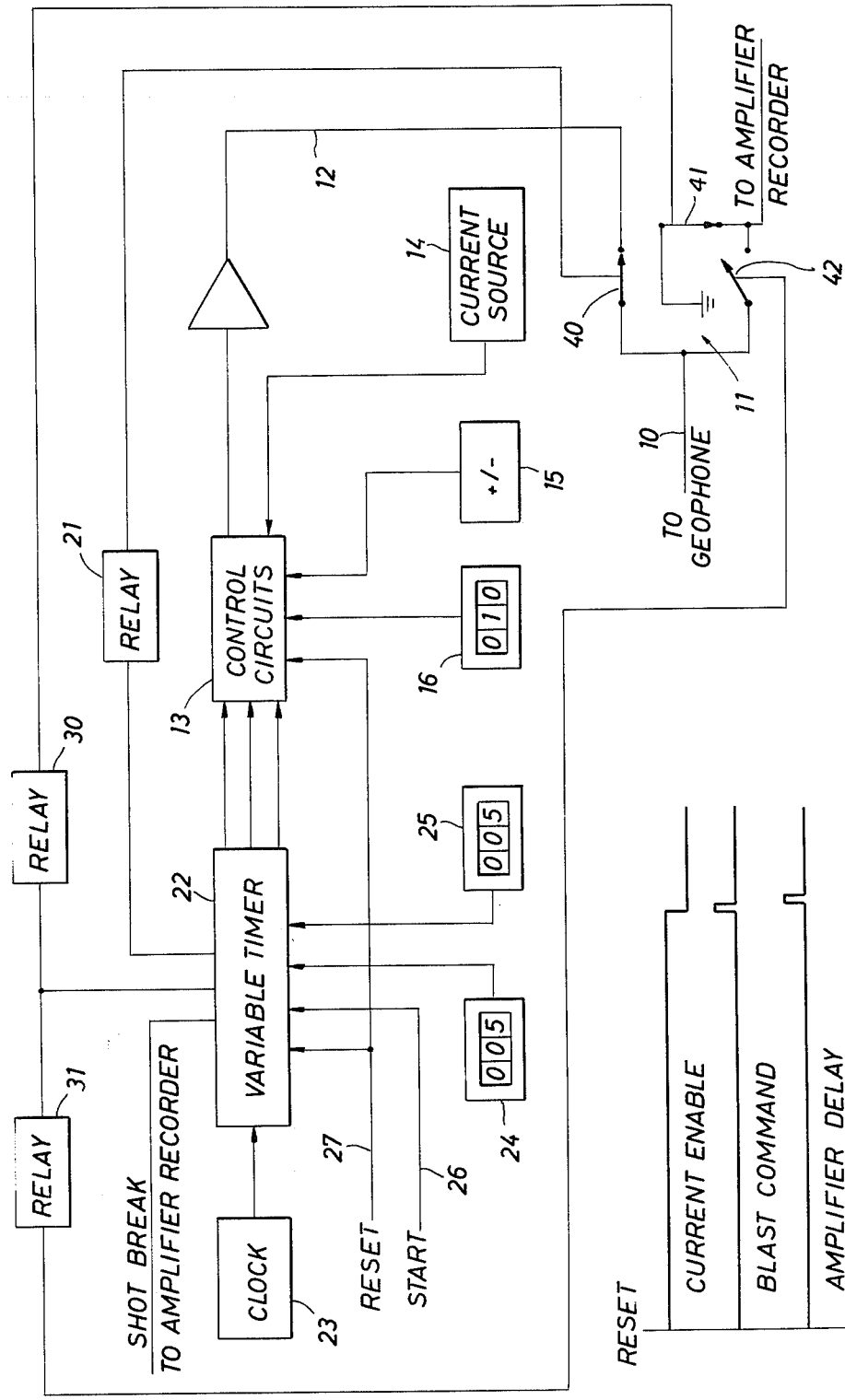

CURRENT IMPULSE METHOD AND APPARATUS FOR TESTING GEOPHONE STRINGS

BACKGROUND OF THE INVENTION

The present invention relates to a method and apparatus for testing geophones and particular stations of geophones. The term "geophone stations" is used to describe strings of geophones that are planted on the earth's surface and the cables used to connect them to a recording system. Further, the term "geophone stations" normally refers to the geophone strings and their connecting cables that are connected to a single recording channel on the acquisition equipment. Conventional land seismic crews utilize 48 to 96 channels of recording or acquisition equipment. Thus, the normal land crew would have 48 to 96 geophone stations with several strings of geophones per station.

When geophones are planted on the earth' surface, some are inclined at an angle which prevents the movable coil from correctly responding to the earth's vibration while others may be suspended in air and not in contact with the earth. Also, due to the rough handling of geophones and their associated cables, physical damage is done to the goephones which prevents them from responding properly to the earth's vibrations. Rough handling can also cause the connecting cables to break and introduce an open circuit in the system.

In the past, various means have been suggested for testing geophones and their associated cables and recording systems for proper operations. One such method is the creation of vibration in the earth as by stomping on the earth or dropping a weight adjacent the geophones and recording their response. While these methods have some success it is inconvenient to coordinate between the personnel producing the vibrations and those recording the data.

In U.S. Pat. No. 3,858,169, there is suggested a system for testing geophones and their associated circuits by introducing a current impulse to the geophones. The geophone, when responding to vibrations in the earth produced by seismic waves, is responding primarily to the velocity incident on the geophone case. Thus, it is apparent that if one could introduce a velocity impulse to the geophone by some external means, one could analyze the response of the geophones and their associated circuitry. This would then permit one to determine whether some geophones were inoperative due to physical damage or improper planting on the earth's surface. The patent suggests that a velocity impulse could be applied to the geophones by utilizing very short current impulse having a duration of 1 to 2 milliseconds. The patent particularly stresses that the impulse must be short enough so that little or no physical motion will be imparted in the moving coil of the geophone. After the application of the impulse the response of the geophones is recorded on the normal data acquisition system which provides a record of the response of the geophone and associated circuits. It is claimed this recording can be used to deconvolve subsequent seismic data to remove the effect of the geophones and their associated circuitry from the recorded data.

While the above described system can theoretically operate in practice, it is extremely difficult to supply the accurate current pulse required. There is also some question as to the correctness of their claims. The cables used in conventional geophone circuits can be several from hundreds of feet to tens of thousands of feet long and thus the capacitance of the cables alone prevents the application of a very short current pulse to all of the geophones. As the patent points out, if there is any motion imparted to the coil the system is no longer responding to a velocity impulse but rather a displacement impulse. A displacement impulse would produce an erroneous geophone response and if it were used to deconvolve seismic data, the interpretation of the data would also be in error.

BRIEF SUMMARY OF THE INVENTION

The present invention solves the above problems by using a step voltage or current signal for exercising the geophones. A current signal is preferred because of the voltage drop in the long lines and the impossibility of providing the proper amplitude voltage signal to each geophone. The voltage or current pulse has a sufficient duration to raise all of the geophone coils to an adjustable position short of their stop position. The current pulse is sufficiently long to raise all the geophones to their desired position to provide a step response. This provides more low frequency information and is useful as a field quality check of the geophones and associated circuits. The voltage or current pulse is terminated and after a delay period the geophone step response is recorded. The delay period is sufficiently long to allow the back EMF induced in the geophone coil by the termination of the pulse to decay before the geophone response is recorded. In addition, steps are taken to ensure that the input to the recording system is shunted to ground during the switching operations so that no switch noise will be induced in the recording.

It can be shown that the geophone response to the step current pulse can be related to the response to a geophone case velocity impulse by taking the second time derivative of the signal resulting from the step pulse. The second derivative of the recorded signal will be the time equivalent of the geophone case velocity impulse signal and can be used to deconvolve the recorded seismic data. Since a step current pulse having a long duration is used to exercise the geophone, the problem of creating a very short pulse to induce a velocity impulse in the geophone is eliminated.

BRIEF DESCRIPTION OF THE DRAWING

The present invention will be more easily understood from the following detailed description of a preferred embodiment when taken in conjunction with the attached drawing showing:

FIG. 1 is a block diagram of a circuit for performing the method of the present invention; and FIG. 2 is a series of waveforms illustrating the time delays of the circuit shown in FIG. 1.

PREFERRED EMBODIMENT

As explained above, the present invention requires the application of a small amplitude voltage or current pulse to the geophones to raise their movable element to a position short of their stops. Of course, by reversing the polarity of the voltage or current, one could force the geophones downwardly. It has been found that a current pulse of approximately 0.1 to 1.0 milliamperes at a voltage not exceeding 10 volts is sufficient to exercise three groups of eight geophones in series, with each geophone having approximately 300 ohms resistance and fundamental frequency response of 8 Hz. The drive level should be large enough so that it overrides the system noise but not large enough to raise the geophone against the stops. Prior to terminating the current pulse the connection between the geophone string and the recording system is shorted to ground to prevent the high amplitude transient switching signals from interfering or damaging the recording system. After the termination of the pulse a time delay having a variable period is allowed to elapse before the geophone string is connected to the recording system. This time interval is normally in the range of a fraction of a millisecond and should be set sufficiently long to allow the decay of the back EMF generated in the geophone coils and their connecting cables. After the termination of the delay period the geophone signal is applied to the recording system and recorded. As will be explained below the second derivative of the recorded signal is the time equivalent of a velocity impulse response of the geophones. Thus, when the subsequently recorded seismic data is processed, the second derivative of the recorded signal can be obtained and used to deconvolve the recorded seismic data. This will remove the response of the geophones and their associated circuitry from the data. Since all seismic data is now recorded in a digital form and processed on a computer it is a simple matter to take the second derivative of the signal and use it to deconvolve the seismic data.

In seismic exploration the signal, s(t), that is incident upon the earth's surface or the geophone case (the detector) is a function of the source wavelet and the reflection it undergoes due to changes in the acoustic impedance of the subsurface medium. The recorded signal, r(t), however, is not just the incident signal; rather it is distorted by the total impulse response of the detection system, $h_T(t)$, $$r(t) = h_T(t) * s(t) \tag{1}$$

and it can significantly differ from s(t). If $h_T(t)$ were known its inverse, $h_T^{-1}(t)$, could be calculated and the system effects routinely removed by deconvolution. Knowledge of $h_T(t)$ is also useful for routine quality control.

The total impulse response of a land seismic data acquisition system is the signal which is recorded when an impulse in velocity is simultaneously given to the cases of all the geophones in an array. This signal depends upon the impulse response of the individual components of the system. Mathematically it is written as the convolution of all the individual impulse responses $$h_T(t) = h_i(t) * h_f(t) * \ldots * h_c(t) * h_g(t) \tag{2}$$

where $h_g(t)$ is the geophone response, $h_c$ the cable response, $h_f$ filter response, $h_i$ instrument response, and . . . represents other elements of the system. A direct measurement of $h_T(t)$ is not possible because the necessary input to the geophones cannot be generated. However, an extremely accurate approximation to $h_T(t)$ can be obtained by standard techniques, the procedure involves recording the voltage or current step response of the geophones. In the next section we show that the voltage step response is equivalent to a case acceleration step response and that the velocity impulse response can be computed given the step response.

VOLTAGE STEP RESPONSE AND VELOCITY IMPULSE RESPONSE

While the term voltage pulse is used to describe the signal applied to the geophone, obviously it could be a current pulse and the results would be the same. Normally, it is easier to provide accurate current sources and in practice it would be preferable to use a current pulse.

The voltage step response of a geophone is obtained by applying a steady voltage to the geophone causing the coil to be displaced away from its equilibrium position. Then the external voltage is removed and the transient response of the geophone is recorded. This output voltage step response for an underdamped geophone is an oscillatory function that decays exponentially in a characteristic time, dependent on the amount of the damping and the geophone natural frequencies.

The voltage step response, in the limit that the coil induction is negligible, is equivalent to a step in acceleration applied to the geophone case. This is most easily seen by inspection of the equation of motion for the geophone coil when driven in series by an external voltage source, $e_{ext}(t)$. The equation of motion for a geophone of natural frequency $\omega_0$, damping $\eta$, transduction S, resistance R, and coil mass m is then given by $$\ddot{x} + 2\eta\dot{x} + \omega_0^2 x = \omega_0^2 x_o - g - \ddot{x}_c - (S/mR)e_{ext}(t). \tag{3}$$

Where x is the position of the coil relative to the case and measured from the equilibrium position $x_o$, g is the acceleration due to gravity, and $x_c$ is the case acceleration. Now by inspection it is obvious that changes in gravity, case acceleration, or external applied voltage act in exactly the same way; i.e, a step in case acceleration is equivalent to a step in applied voltage to within constant scale factors.

We now turn to analysis of two cases; the voltage step response and the velocity impulse response. In the two cases of interest the driving terms in (3) are given by $$e_{ext}(t) = e_o(1 - \theta(t)) \text{ voltage step response} \tag{4a}$$

$$\ddot{x}_c = 0$$

$$e_{ext}(t) = 0 \text{ voltage response} \tag{4b}$$

$$v_c = a\delta(t) \text{ velocity impulse response}$$

with the strength of the velocity impulse given by the constant a, $\theta(t) = 1, t > 0$; 0 otherwise, and $\delta(t)$ is a delta function. The relevant quantity is $v = \dot{x}$ so a further time derivative of (3) is taken and $x_o$ is chosen to remove the term $-g$. The analysis is most easily carried out in the frequency domain where $v(t) = \int d\omega/2\pi \, v(\omega) \, e^{i\omega t}$. The result from (3) with (4) is $$V(\omega) = \frac{1}{(\omega^2 + 2\eta\omega + \omega_0^2)} \times \frac{-e_{ext}}{mR} \text{ voltage step response} \tag{5a}$$

$$\omega^2 a \quad \text{velocity impulse response} \tag{5b}$$

The two solutions in the frequency domain differ by a factor $-\omega^2$ aside from scale factors. However, multiplication by $(i\omega)$ in the frequency domain is equivalent to a time derivative in the time domain so that $(i\omega)^2$ is two time derivatives. Therefore the voltage step response can be interpreted as an acceleration step response and two time derivatives make the resulting signal equivalent to a velocity impulse response.

The above results have neglected the effects of the coil induction L and cable capacitance. It can be shown that the above results are valid for frequencies that satisfy $\omega \tau_L < 1$ where $\tau_L$ is the inductive decay time $$\tau_L = L/R. \quad (6)$$

or $$\omega \tau_c < 1 \text{ when the capacitive decay time } \tau_c = RC \quad (7)$$

Typical L for modern geophones are tenths of henry (L ~0.1) hy) and typically R ~ $10^3$ Ω which gives $\tau_L \sim 10^{-4}$ sec. Therefore there will be differences in response only for short time variations $t < \tau_L$ or $\omega > 10^4$ sec$^{-1}$, $f > 10^3$ hz, far above the seismic band. Cable capacitance can be as high as 0.5 μf so that $\tau_c \sim 5.10^{-4}$ sec which is a short time. The inductor has the further effect that when the voltage is removed from the geophone (to make the step in voltage) the EMF does not instantaneously fall to zero. The back EMF of the coil causes an inductive spike that rapidly decays as $e^{-t/\tau_L}$. The other time scales in the problem (the zero crossing times and the decay time) are much longer than $\tau$. The short time behavior $t \sim \tau$ does not effect the long time measurement; however, care must be used to shield the seismic instrument from the inductive spikes as they can damage the instrument and also will severely distort the recording.

Referring now to FIG. 1, there is shown a system suitable for obtaining a step current response of a geophone string. The system shown is particularly adaptable to a seismic recording system known as DFS-5 manufactured by Texas Instruments Company in Houston, Texas. This system normally comprises 60 recording channels. The system has been modified to include an input panel having a series of relay operated switches which will couple all the recording channels to a test circuit or to the recording system. Inclusion of this panel provides a simple means by which a current pulse can be applied to the geophone strings, removed and the geophone strings connected to the recording system. The modified input panel also includes balancing or normalizing resistors whose values are chosen so that the resistance of all geophone strings is substantially equal. This features allows the use of a single current source to apply current to all of the geophone strings. The resistances are changeable in order to equalize resistances when various lengths of connecting cables are used for the geophone strings.

In the system shown the cable 10 extends to the geophone station while the switch 11 represents the switch included in the modified input panel of the DFS-5 system which permits coupling the geophone string either to a test circuit or to the recording system. The switch 11 has multiple contacts that are operated by various relay coils as described below. In the alternative, the switch may comprise a plurality of individual relay switches. The geophone string is supplied with current over lead 12 from a control circuit 13. The control circuit is supplied from a current source 14 and includes means 16 for varying the amplitude of the current source and a means 15 for reversing the direction of the current flow. The means 16 may be a conventional thumbwheel type switch which connects various resistances in the control circuit for controlling the amplitude of the current pulse while the switch 15 merely reverses the direction of the current flow. The reversal of direction of the current flow will reverse the direction of movement of the coil in the geophones. The control circuit 13 is controlled by a variable timer 22 which is provided with two thumbwheel switches 24 and 25. The thumbwheel switches are used to vary time periods supplied by the timer 22. The current is maintained at a constant level until given a signal to terminate. After the termination of the current pulse, a delay period is observed before the geophones are connected to the recording system. The delay system or amplifier delay period is adjusted to a time that is sufficient to allow the back EMF generated by the termination of the current pulse to decay before recording the geophone response. The timer also supplies a signal to a relay 21 which actuates the contact 40 of the switch 11 described above. The relay 21 is actuated when it is desired to terminate the application of the current pulse and move the relay switch 11 to the record position. The timer also generates the amplifier delay period signal that opens relay 30 to remove a ground from the amplifier recorder cable by opening the contact 41 of the switch 11. At the same time the relay 31 closes to close contacts 42 of the switch 11 to connect the geophones to the recording system.

The timer is supplied with a pulse train from a fixed clock source 23 for determining the variable time periods. The timer is also supplied with a reset input 27 which resets both the timer and the control circuits 13. Likewise, the timer is supplied with a start switch 26 that is used to actuate the timer to start the counting of the delay periods.

Referring to FIG. 2, there is shown a timing diagram having three waveforms. The upper waveform illustrates the duration of the current pulse and as explained, it is normally 75 milliseconds. The current pulse is terminated by a signal denoted blast command which is used to both terminate the current pulse and start the amplifier delay period. As illustrated, the amplifier delay period should be sufficient to allow the back EMF produced by the termination of the current pulse to decay. As explained the amplifier delay pulse is also used to remove the ground from the lead to the amplifier recording system.

In operation the system first supplies the current pulse to the geophone string to cause the moving element or coil of the geophone to lift. Of course, if the current flow is reversed the coil will be driven downwardly. The current pulse should have a duration sufficient to lift the coil of the geophone and retain it in a fixed position. After the current pulse is terminated and the termination of the time delays, the geophone string is connected to the recording system. Normally, the amplifier delay period is relatively short, in the neighborhood of 0.5 to 5 milliseconds and is used to permit the back EMF to decay. After the amplifier delay the geophone string's response to the current pulse is recorded utilizing the conventional digital recording system. The recorded signal can then be differentiated twice to supply a signal which is the time equivalent of a velocity impulse response to the geophone. This signal can be derived when the seismic data is processed in the central processing computer. Of course, it is also possible to take the second derivative and utilize the signal in other ways in deconvolving recorded seismic data.

What is claimed is:

1. A method for obtaining the time equivalent velocity response of a string of geophones and their associated data acquisition system, said method comprising:

applying a current pulse to said geophones, said pulse having sufficient duration to move said geophones to a stationary position intermediate their stops;

terminating said current pulse and recording said geophone response; and taking the second derivative of the recorded response to obtain the time equivalent of the response of the geophones to a velocity impulse.

2. The method of claim 1 wherein a delay period is interposed between the termination of the current pulse and recording of said geophone response.

3. The method of claim 1 wherein the response of each channel of the acquisition system is recorded separately.

4. The method of claim 2 wherein the time delay is sufficient to allow decay of the back EMF of the system.

5. An apparatus for obtaining data from which the time equivalent of the velocity response of a string of geophones and their associated acquisition system may be determined, said apparatus comprising:

an adjustable current source, said source being adjusted to lift said geophones to a position intermediate their stops;

a clock circuit, said clock circuit supplying a constant frequency signal;

a variable timer, said timer being responsive to said clock to supply a plurality of timed output signals;

a first switch means responsive to one of the signals from said timer for coupling said current source to said geophones, said one signal having a duration sufficiently long to permit said geophones to reach a steady state condition;

a second switch means responsive to a second signal from said timer for coupling said acquisition system to said geophones after said current source is decoupled from said geophones; and a third switch means responsive to a third signal from said timer for grounding said acquisition system prior to decoupling said current source and removing said ground prior to said geophones being coupled to said acquisition system.

6. The apparatus of claim 5 wherein there is a delay of from 0.5 to 5 milliseconds between decoupling of said current source and coupling of said acquisition system to said geophones.

* * * * *